United States Patent
Kluge

(10) Patent No.: US 9,579,921 B2
(45) Date of Patent: Feb. 28, 2017

(54) CARD-SHAPED DATA CARRIER

(75) Inventor: Stefan Kluge, München (DE)

(73) Assignee: Giesecke & Devrient GmbH, München (DE)

( * ) Notice: Subject to any disclaimer, the term of this patent is extended or adjusted under 35 U.S.C. 154(b) by 1340 days.

(21) Appl. No.: 11/990,715

(22) PCT Filed: Aug. 14, 2006

(86) PCT No.: PCT/EP2006/008037
§ 371 (c)(1),
(2), (4) Date: Apr. 10, 2009

(87) PCT Pub. No.: WO2007/020047
PCT Pub. Date: Feb. 22, 2007

(65) Prior Publication Data
US 2009/0206164 A1   Aug. 20, 2009

(30) Foreign Application Priority Data
Aug. 19, 2005   (DE) .......... 10 2005 039 319

(51) Int. Cl.
*B42D 25/00*   (2014.01)
(52) U.S. Cl.
CPC .......... *B42D 25/00* (2014.10); *B42D 2035/20* (2013.01)
(58) Field of Classification Search
USPC ........................................................ 235/492
See application file for complete search history.

(56) References Cited

U.S. PATENT DOCUMENTS

| | | | |
|---|---|---|---|
| 3,604,901 A | 9/1971 | Morita et al. | |
| 5,567,362 A | 10/1996 | Grun | |
| 6,533,436 B2 | 3/2003 | Krietzman et al. | |
| 2003/0226899 A1* | 12/2003 | Finkelstein | G02B 3/08 235/492 |
| 2004/0118930 A1* | 6/2004 | Berardi | G06K 7/0008 235/492 |

(Continued)

FOREIGN PATENT DOCUMENTS

| DE | 195 30 823 | 2/1997 |
|---|---|---|
| DE | 197 39 657 | 3/1999 |

(Continued)

OTHER PUBLICATIONS

Notice of Grounds for Rejection issued in Japanese Application No. 2008-526425, Japan Patent Office, Nov. 8, 2011.

(Continued)

*Primary Examiner* — Michael G Lee
*Assistant Examiner* — David Tardif
(74) *Attorney, Agent, or Firm* — Martine Penilla Group, LLP

(57) ABSTRACT

The invention relates to a card-shaped data carrier (1) comprising a card body (2) provided with a graphical element (6) displayed thereon. The card body (2) is made of a plastic material for converting irradiated light into secondary light and for retransmitting the secondary light within the plastic material to the graphical element (6) or to a portion of the graphical element (6). The inventive card-shaped data carrier (1) is characterized in that the card body (2) is provided with a light source (18) for irradiating light into a shaped body (12) formed by the plastic material.

27 Claims, 4 Drawing Sheets

(56) References Cited

U.S. PATENT DOCUMENTS

Figure 1:
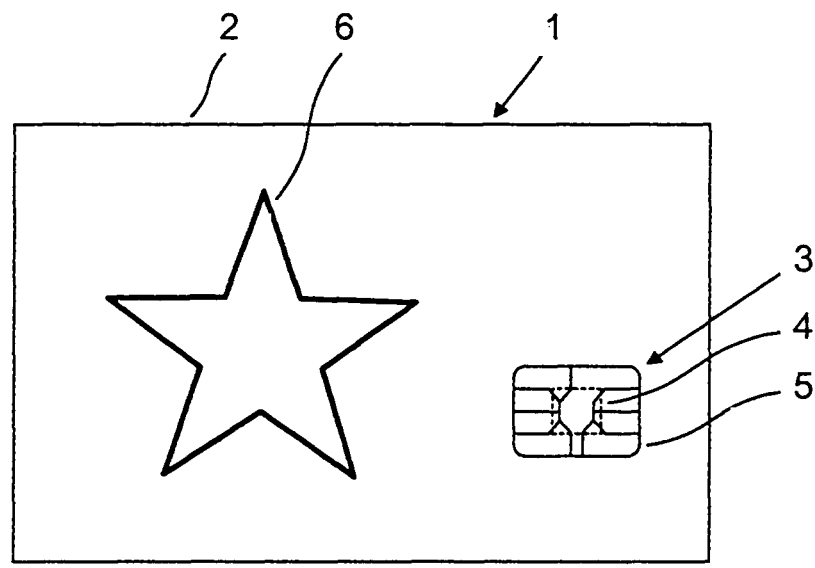

| | | | |
|---|---|---|---|
| 2004/0205988 A1* | 10/2004 | Kohler | B42D 15/022 40/124.02 |
| 2005/0066103 A1 | 3/2005 | Shinozaki | |
| 2006/0124750 A1* | 6/2006 | Reiner | G06K 19/07745 235/492 |
| 2010/0001077 A1* | 1/2010 | Kluge | B42D 25/00 235/488 |

FOREIGN PATENT DOCUMENTS

| | | |
|---|---|---|
| DE | 199 40 561 | 4/2001 |
| DE | 100 48 812 | 4/2002 |
| DE | 101 53 260 | 5/2003 |
| DE | 103 17 467 | 11/2004 |
| DE | 103 25 604 | 12/2004 |
| DE | 103 44 271 | 4/2005 |
| EP | 0 302 453 | 2/1989 |
| EP | 0 902 392 | 3/1999 |
| JP | 49-77875 | 10/1972 |
| JP | 58-163994 | 11/1983 |
| JP | 60-172077 | 9/1985 |
| JP | 61-130982 | 8/1986 |
| JP | 63-070370 | 5/1988 |
| JP | 01-210391 | 8/1989 |
| JP | 01-142078 | 9/1989 |
| JP | 05-025751 | 4/1993 |
| JP | 05-278067 | 10/1993 |
| JP | 06-104491 | 4/1994 |
| JP | 07-019775 | 1/1995 |
| JP | 10-236039 | 9/1998 |
| JP | 11-041366 | 2/1999 |
| JP | 2000-194808 | 7/2000 |
| JP | 2001334779 A | 12/2001 |
| JP | 2002-286941 | 10/2002 |
| JP | 3097222 | 1/2004 |
| JP | 2004-235669 | 8/2004 |
| JP | 2004265176 A | 9/2004 |
| JP | 2005-084853 | 3/2005 |
| JP | 2005-196445 | 7/2005 |
| JP | 2006099289 A | 4/2006 |
| WO | WO 93/23826 | 11/1993 |
| WO | WO 99/36728 | 7/1999 |
| WO | WO 03/057502 | 7/2003 |

OTHER PUBLICATIONS

Decision to Grant issued in Japanese Application No. 2008-526425 dated Jan. 15, 2013 (4 pages).

* cited by examiner

CARD-SHAPED DATA CARRIER

The invention relates to a card-shaped data carrier.

Card-shaped data carriers, in particular chip cards, are used in many areas, for example as identification documents, as proof of an authorization for accessing a cell phone network, or for carrying out cashless payment transactions. A chip card has a card body and an integrated circuit embedded into the card body. The actual functionality of the chip card is provided by the integrated circuit. For this purpose, data is stored and applications are implemented, for example, in the integrated circuit. The card body serves the purpose of handling the chip card, and can serve as carrier of visual information and of safety features. Generally, efforts are made for giving the chip card an attractive appearance through a suitable design of the card body.

From DE 101 53 260 A1, a data carrier card having a plate-shaped card body made of a transparent plastic material is known to which fluorescent coloring agents have been added. If the flat sides of the data carrier card are irradiated with light, the card will give off light in the color of the admixed fluorescent coloring agent, for example at its edge surfaces. This light effect can be used in security checks of such a card.

From DE 100 48 812 A1, a method is known for personalizing luminescent authenticity marks on data carriers. A luminescent authenticity mark is inserted into or applied onto the card composite in this method. Then, the authenticity mark is personalized using a high-energy beam. In this way, the structure of the authenticity mark is changed locally such that the lettering inscribed by the personalization becomes apparent as a negative image when the authenticity feature luminesces. The excitation of the luminescence or phosphorescence is done by means of UV radiation or an electromagnetic field. The authenticity mark is invisible under normal conditions.

From U.S. Pat. No. 3,604,901, an information card having a laminate structure of three layers is known. A bottom layer of an opaque material has holes that represent encoded information. An intermediate layer of a translucent material fills up the holes. An upper layer of a transparent material protects the intermediate layer.

From WO 93/23826 A1, a chip card is known in which a light-collecting plastic is used for transferring light signals to receiver diodes. The light signals are influenced by optical switching elements. A secret code, for example, can be inputted by means of the optical switching elements. Light irradiation may occur coming from the environment or by means of an integrated emitting diode.

The invention is based on the object of designing the structure of a card body in such a way that one or more graphical elements of the card body are highlighted visually.

This object is solved by a card-shaped data carrier having the combination of features of claim 1.

The card-shaped data carrier according to the invention has a card body on which a graphical element is displayed. The card body has a plastic material for converting incident light into secondary light and for transferring the secondary light within the plastic material to the graphical element or a portion of the graphical element. The characteristic trait of the card-shaped data carrier according to the invention is that the card body has a light source for radiating light into a shaped body formed by the plastic material.

The invention has the advantage that clear visual highlighting of a graphical element on a card body is possible with a reasonable expenditure. Here, it is particularly advantageous that the graphical element is clearly visible, even given unfavorable external lighting conditions, due to the light source disposed in the card body. The card-shaped data carrier of the invention is durable and has a high-quality and distinctive external appearance.

The light source is preferably disposed at least partially within the shaped body. This ensures that a high proportion of the light from the light source actually arrives in the shaped body, so that good efficiency is obtained. In particular, the light source is disposed in the area of a narrow side of the shaped body, so that the incident light travels a long distance in the shaped body and is converted into secondary light as completely as possible. Towards the outer side of the card body, the light source may be covered by at least one opaque layer so as not to be visible from the outside.

The card body may have an electrical energy storage device for supplying the light source with electrical energy so that the light source is functional even without an external device. Further, the card body may have a switching element for switching the light source on and off. This enables, for example, an option for the user to intervene and preserves the internal energy storage device possibly present. Likewise, it is also possible that the card body has a receiving device for contactless energy transmission. In this case, the light source may be connected to the receiving device so that no internal energy storage device is needed. Preferably, the light source is formed as a light-emitting diode. Light-emitting diodes are available in very small mounting dimensions and have relatively small energy consumption.

The shaped body for displaying the graphical element may at least partially be disposed in at least one cavity of the card body. Further, the shaped body for displaying the graphical element may have a laterally extended area within which the shaped body has other optical properties than outside of the area.

In a preferred exemplary embodiment of the card-shaped data carrier, the shaped body is formed to be clear at least in some areas (in the sense of clearly transparent or see-through). It is accomplished in this manner that the outlines of the shaped body have an increased brightness in the clear areas.

The shaped body can be made clear or milky within the cavity. This way, it is possible that either the outlines of the cavity become apparent because of an increased brightness, or that the cavity has approximately the same brightness over its entire surface.

It is particularly advantageous if the shaped body has a greater lateral extent than the cavity. This brings about a concentration of the light in the area of the cavity, so that a high brightness is achieved.

In the lateral surrounding area of the cavity, the card body is preferably made opaque. This has the advantage that a high contrast can be achieved and that no undesired effects arising from scattered light occur outside of the cavity. In particular, the card material adjoining the cavity laterally may be opaque. It is also possible that opaque printing is provided on the card body at least in a lateral area surrounding the cavity.

The different optical properties within an area of the shaped body can be realized in various ways. For example, the shaped body can be made milky within this area. In that case, the brightness within the entire area is slightly higher than in its surrounding area. It is also possible that the shaped body has a three-dimensional surface structure within the area. This also leads to an increased brightness within the area. The three-dimensional surface structure can be formed by a plurality of elevations and/or depressions distributed over the entire surface of the area.

The secondary light is preferably transferred parallel to a main surface of the shaped body. The card body may have a transparent cover layer on at least one main surface, in particular for protection against dirt and wear. The card body is preferably produced by lamination. The plastic material can be processed well and a high-quality card body can be produced using the lamination technique. The shaped body is preferably formed as a stamped part.

The card body may have a magnetic strip and/or an integrated circuit.

Referring to the exemplary embodiments shown in the drawings, the invention is explained below.

Figure 2:
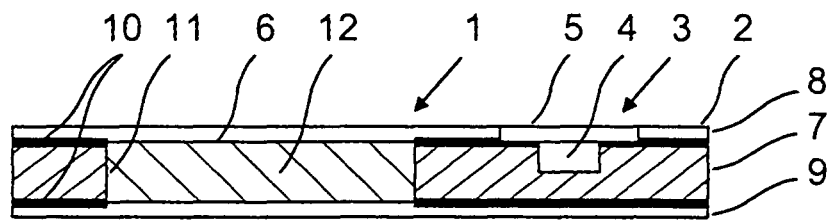
Figure 3:
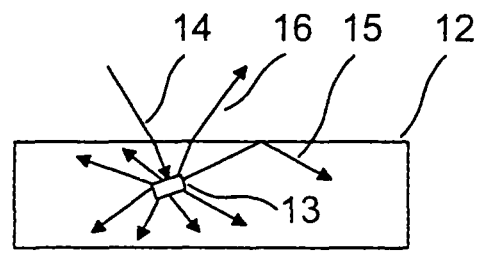
Figure 4:
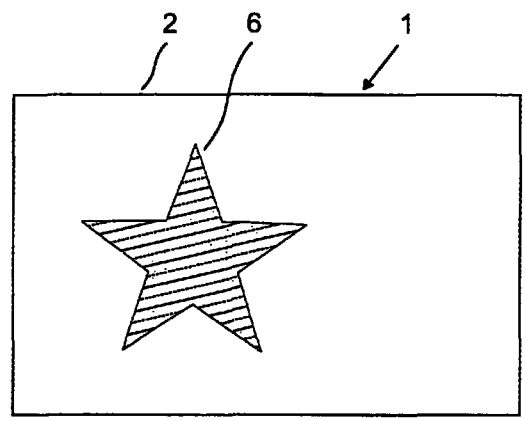
Figure 5:
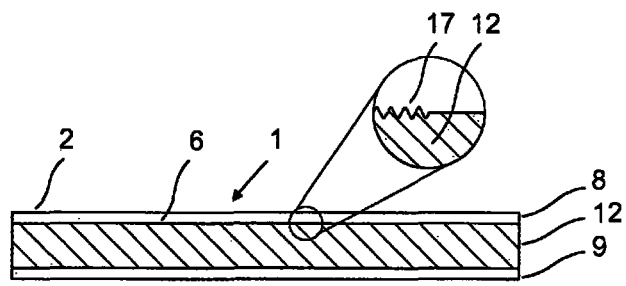
Figure 6:
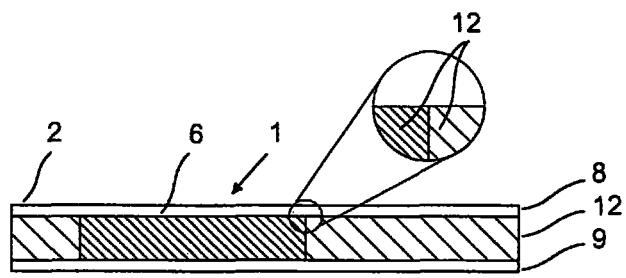
Figure 7:
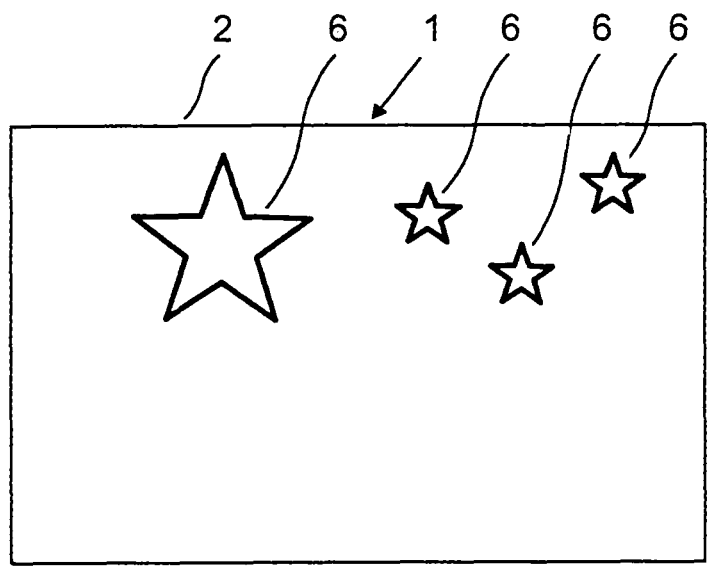
Figure 8:
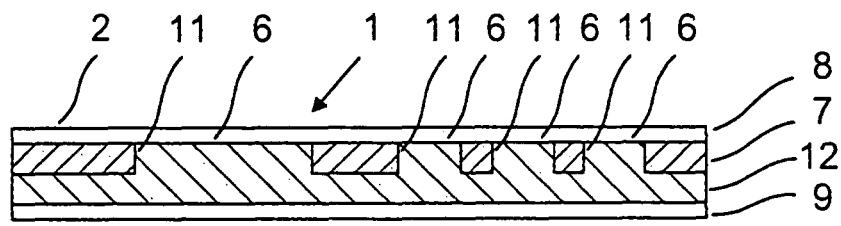
Figure 9:
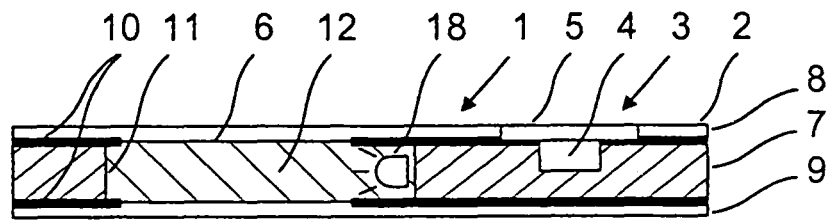
Figure 10:
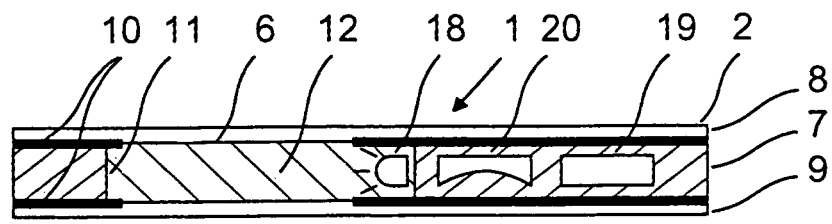
Figure 11:
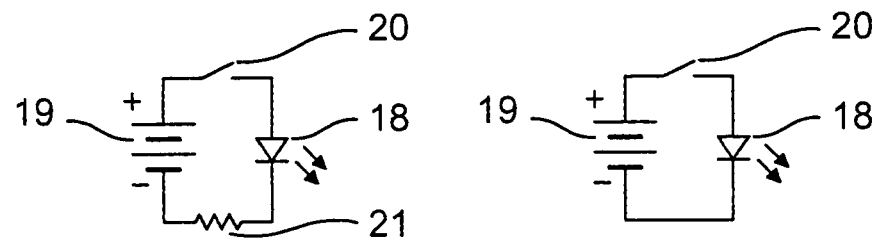
Figure 12:
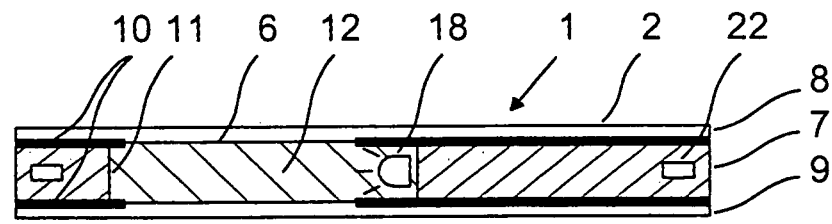
Figure 13:
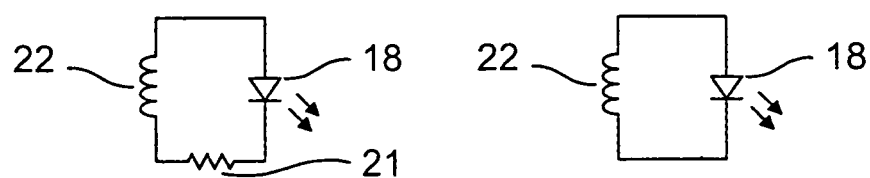

In the figures:

FIG. 1 shows a first exemplary embodiment of a card formed according to the invention in a schematic top view, FIG. 2 shows the first exemplary embodiment of the card in a schematic sectional view, FIG. 3 shows the light-collecting sheet in a schematic sectional view, FIG. 4 shows a second exemplary embodiment of the card in a schematic top view, FIG. 5 shows the second exemplary embodiment of the card in a schematic sectional view, FIG. 6 shows a third exemplary embodiment of the card in a schematic sectional view, FIG. 7 shows a fourth exemplary embodiment of the card in a schematic top view, FIG. 8 shows the fourth exemplary embodiment of the card in a schematic sectional view, FIG. 9 shows a fifth exemplary embodiment of the card in a schematic sectional view, FIG. 10 shows a sixth exemplary embodiment of the card in a schematic sectional view, FIG. 11 shows a circuit diagram, respectively, for two different wirings of the light-emitting diode provided in the sixth exemplary embodiment of the card, FIG. 12 shows a seventh exemplary embodiment of the card in a schematic sectional view, and FIG. 13 shows a circuit diagram, respectively, for two different wirings of the light-emitting diode in the seventh exemplary embodiment of the card.

FIG. 1 shows a first exemplary embodiment of a card 1 formed according to the invention in a schematic top view. A schematic sectional view associated therewith is shown in FIG. 2. The card 1 preferably is formed as a chip card having a card body 2 in which a chip module 3 is embedded. The chip module 3 has an integrated circuit 4 and a contact field 5 connected with the integrated circuit 4. For carrying out a data transmission between the integrated circuit 4 and an external device not shown in the figures, the contact field 5 of the chip module 3 is contacted by touch by the external device. As an alternative to the representation of FIGS. 1 and 2, the chip module 3 may also be formed for contactless data transmission, and may then, in particular, be disposed inside the card body 2. The card 1 may also be equipped with a magnetic strip for storing data, the strip not being shown in the figures. All this also applies to the other exemplary embodiments of the card 1. In the case of these exemplary embodiments, a depiction in the figures of the chip module 3 was dispensed with in part.

The card body 2 has a graphical element 6, for example in the shape of a lettering, a flag, a logo, an emblem or some other symbol. The graphical element 6 appears visually due to areas that are brightened in comparison with the surrounding areas. This is accomplished by a structure of the card body 2 in which several plastic sheets having different optical properties are bonded together by lamination.

In detail, the card body 2 in the first exemplary embodiment has a core sheet 7 whose first main surface is covered by a first cover sheet 8 and whose second main surface is covered by a second cover sheet 9. The core sheet 7 is provided on both sides, over the entire surface, with an imprint 10 which is opaque in the range of visible light. The imprint 10 may also be applied to the inner sides, i.e., to the main surfaces adjacent to the core sheet 7, of the cover sheets 8 and 9. The cover sheets 8 and 9 are each made transparent in the range of visible light.

A window-like cavity 11 whose shape is determined by the graphical element 6 is formed in the core sheet 7. Within the cavity 11, the core sheet 7 is replaced by a light-collecting sheet 12 which has the outer shape of the graphical element 6 and has been produced, for example, by a stamping process. The light-collecting sheet 12 is transparent and made to be, in particular, clear, that is, the outlines of an item are clearly discernible through the light-collecting sheet 12. No imprint 10 is provided in the area of the cavity 11, that is, the light-collecting sheet 12 is not covered up by the imprint 10. However, the cover sheets 8 and 9 each also extend over the cavity 11 so that the light-collecting sheet 12 is covered on both sides by the cover sheets 8 and 9, respectively. As will be explained in more detail referring to FIG. 3, the area of the light-collecting sheet 12 appears somewhat brighter than the surrounding area and has a significantly increased brightness along its contour, i.e., the boundary surface to the laterally adjacent core sheet 7. Thus, the graphical element 6 is characterized by a contour that has a very bright appearance.

In a modification of the first exemplary embodiment of the card 1, the first cover sheet 8 and/or the second cover sheet 9 is/are omitted.

FIG. 3 shows the light-collecting sheet 12 in a schematic sectional view. The light-collecting sheet 12 consists of a plastic, for example, of a polycarbonate or PVC in which a fluorescent coloring agent has been incorporated. By way of example, a particle 13 of the coloring agent is displayed under strong magnification in FIG. 3. If irradiated with light, the particle 13 of the coloring agent is excited to fluoresce and emits fluorescent light having a greater wavelength than the incident light into all directions. The incident beams of light are designated by reference numeral 14 in FIG. 3, the beams of fluorescent light are designated by reference numerals 15 and 16.

The fluorescent beams 15 hit the main surfaces of the light-collecting sheet 12, each of which represents a boundary surface between the light-collecting sheet 12 and the air surrounding the light-collecting sheet 12, at relatively large angles. Because the light-collecting sheet 12 has a higher refractive index than the air, reflection occurs at the boundary surface in the case of angles below the critical angle of total reflection. This means that the fluorescent beams 15 do not leave the light-collecting sheet 12 but are alternately reflected at the opposite main surfaces until they reach one of the end faces of the light-collecting sheet 12 that connect the two main surfaces. Since the fluorescent beams 15 hit the end face at a relatively large angle, they exit the light-collecting sheet 12 through the end face. When passing the end face, the fluorescent beams 15 are refracted in accordance with the ratio of refractive indices between the light-collecting sheet 12 and the ambient air.

The fluorescent beams 16 that hit one of the main surfaces of the light-collecting sheet 12 in an angle below the critical angle of total reflection penetrate the main surface and are refracted in the process. This means that the light beams 14 hitting the main surfaces of the light-collecting sheet 12 generate fluorescent beams 15 and 16 that exit the light-collecting sheet 12 in part through their end faces and in part through their main surfaces. Since the end faces have a considerably smaller surface area than the main surfaces, the light concentrates in the area of the end faces and there leads to an increased brightness.

FIG. 4 shows a second exemplary embodiment of the card 1 in a schematic top view. A schematic sectional view associated therewith is shown in FIG. 5. In contrast to the first exemplary embodiment of the card 1, the second exemplary embodiment has no graphical element 6 with particularly bright contours. Instead, the entire surface of the graphical element 6 is evenly illuminated.

This is accomplished by the light-collecting sheet 12 in the second exemplary embodiment not being limited to the area of the graphical element 6, but that it extends beyond it laterally, and preferably extends over the entire card body 2. The main surfaces of the light-collecting sheet 12 are covered with the transparent cover sheets 8 and 9. The light-collecting sheet 12 is made to be clear and has a three-dimensional surface structure 17 in the area of the graphical element 6. The surface structure 17 is displayed in the enlarged section of FIG. 5 and has a plurality of laterally consecutive elevations and depressions which may be formed, for example, in an undulating manner. Because of the surface structure 17, the proportion of fluorescent beams 15 reflected on the boundary surface of the light-collecting sheet 12 is reduced and the proportion of the fluorescent beams 16 passing through the boundary surface is increased. This leads to the entire area of the surface structure 17 appearing brighter than the adjacent areas of the light-collecting sheet 12 having a smooth surface. The contour of the graphical element 6 has no increased brightness or only one that is slightly increased, compared with its interior area.

In a modification of the second exemplary embodiment of the card 1, the first cover sheet 8 and/or the second cover sheet 9 is omitted.

FIG. 6 shows a third exemplary embodiment of the card 1 in a schematic sectional view. The top view associated therewith corresponds to FIG. 4. In the third exemplary embodiment, the light-collecting sheet 12 is made to be milky within the graphical element 6, and clear outside of the graphical element 6. This can be realized by means of a laterally continuous light-collecting sheet 12 having areas that have been treated in a different manner. Several different light-collecting sheets 12 can also be arranged laterally side by side. The main surfaces of the light-collecting sheets 12 are covered by the cover sheets 8 and 9 in both cases.

In the third exemplary embodiment of the card 1, the milky design of the light-collecting sheet 12 in the area of the graphical element 6 leads to the graphical element 6 appearing brighter over its entire surface than its surrounding area. In contrast to the second exemplary embodiment of the card 1, the main surfaces of the light-collecting sheet 12 are made smooth also in the area of the graphical element 6.

FIG. 7 shows a fourth exemplary embodiment of the card 1 in a schematic top view. A schematic sectional view associated therewith is shown in FIG. 8. The card body 2 has an opaque core sheet 7 having several cavities 11 for one graphical element 6 each. Furthermore, the card body 2 has a light-collecting sheet 12 which, with its main surface, borders on the main surface of the core sheet 7, thus constituting another layer of the card body 2, apart from the core sheet 7. In this case, the light-collecting sheet 12 extends into the cavities 11 of the core sheet 7 and fills up each of them completely. The main surfaces of the card body 2 are each formed by one transparent cover sheet 8 and 9, respectively, that is, both the core sheet 7 as well as the light-collecting sheet 12 are covered by a cover sheet 8 and 9, respectively.

The light-collecting sheet 12 can be made to be continuously clear, that is, both within the layer formed by the light-collecting sheet 12 as well as within the cavities 11 of the core sheet 7. In that case the contours of the graphical element 6 appear very bright, because light is irradiated over an entire main surface of the card body 2 into the light-collecting sheet 12, and the fluorescent light can only escape through the end faces of the light-collecting sheet 12 and through the edges of the cavities 11 in the core sheet 7. The smaller the surface area of the cavities 11 in the core foil 7, the higher the brightness.

If an illumination over the entire area of the cavities 11 in the core sheet 7 is desired, the fourth exemplary embodiment can be modified so that the light-collecting sheet 12 has the three-dimensional surface structure 17 described in the second exemplary embodiment in the area of one or more cavities 11. Likewise, it is also possible to fill one or more of the cavities 11 in the core sheet 7 with a milky light-collecting sheet 12.

FIG. 9 shows a fifth exemplary embodiment of the card 1 in a schematic sectional view. The top view associated therewith corresponds to FIG. 1. In the fifth exemplary embodiment, a light-emitting diode 18 is disposed in the light-collecting sheet 12. Similar to the first exemplary embodiment, the light-collecting sheet 12 is disposed in a cavity 11 in the core sheet 7. The core sheet 7 is provided on both sides with an opaque imprint 10 which extends laterally also partially over the light-collecting sheet 12. This is to prevent the light-emitting diode 18 from being visible from outside the card body 2. The main surfaces of the card body 2 are each formed by one cover sheet 8 and 9, respectively, which cover both the imprints 10 as well as the light-collecting sheet 12.

Because of the light-emitting diode 18, a sufficient brightness of the graphical element 6 is ensured independently from the prevailing lighting conditions. To this end, however, it is necessary that the light-emitting diode 18 be supplied with power. This may be effected through a device that contacts by touch the card 1 for carrying out a data transmission. Contacting should be effected so that the graphical element 6 remains visible. Other options for the power supply of the light-emitting diode 18 are described below.

FIG. 10 shows a sixth exemplary embodiment of the card 1 in a schematic sectional view. The top view associated therewith corresponds to FIG. 1 without the chip module 3. In the sixth exemplary embodiment, a battery 19 as a power supply for the light-emitting diode 18 and a push button 20 for switching the light-emitting diode 18 on and off are disposed within the core sheet 7. Otherwise, the construction of the card body 2 corresponds to the fifth exemplary embodiment. The built-in battery 19 makes it possible to operate the light-emitting diode 18 independently from an external device. Possible wirings of the light-emitting diode 18 are displayed in FIG. 11.

FIG. 11 shows a circuit diagram, respectively, for two different wirings of the light-emitting diode 18 provided in the sixth exemplary embodiment of the card 1. In the circuit diagram displayed on the left, the light-emitting diode 18 is connected to the battery 19 via the push button 20 and a resistor 21, which are connected in series with the light-emitting diode 18. In the circuit diagram displayed on the right, the resistor 21 is omitted.

FIG. 12 shows a seventh exemplary embodiment of the card 1 in a schematic sectional view. The top view associated therewith corresponds to FIG. 1 without the chip module 3. The construction of the card body 2 corresponds to the sixth exemplary embodiment to a large extent. However, the card body 2 in the seventh exemplary embodiment has neither a battery 19 nor a push button 20. Instead, an antenna coil 22 with which the light-emitting diode 18 is supplied with power is disposed in the core sheet 7. For this purpose, it is necessary that the card 1 is located near a transmitting device that generates an electromagnetic field acting on the antenna coil 22 of the card 1. The wiring of the light-emitting diode 18 for this is displayed in FIG. 13. The transmitting device can be a conventional device for contactless communication with the card 1.

FIG. 13 shows a circuit diagram, respectively, for two different wirings of the light-emitting diode in the seventh exemplary embodiment of the card 1. In the circuit diagram displayed on the left, the light-emitting diode 18 is connected to the antenna coil 22 over a resistor 21 connected in series. In the circuit diagram displayed on the right, the light-emitting diode 18 is directly connected to the antenna coil 22.

Alternatively, the light-emitting diode can also be connected with a chip which is linked to an antenna for the purpose of contactless communication.

The exemplary embodiments in which the card 1 has a light-emitting diode 18 can be combined with the constructions for the card body 2 previously described without a light-emitting diode 18. Thus, for example, a light-collecting sheet 12 having a three-dimensional surface structure 17 or a milky light-collecting sheet 12 can be used in a card 1 having a light-emitting diode 18.

All exemplary embodiments in which this is not the case anyway can be modified so that the graphical elements 6 are disposed near the edge of the card body 2. In this way, it is accomplished that the graphical elements 6 are visible even if the card is kept in a wallet, for example. As a rule, the compartments intended for this do not cover the card body 2 completely.

In each of the above-described exemplary embodiments of the card 1, the card body 2 is preferably produced by lamination of several sheets. In the process, the light-collecting sheet 12 is preferably given the desired shape by stamping in those cases where its contour is determined by the graphical element 6.

Likewise, it is also possible to produce the card body 2 in another manner such as for example, by injection molding.

The invention claimed is:
1. A chip card comprising:
a card body on which a graphical element is displayed, the card body having a shaped body that has a main surface for displaying the graphical element, and
a light source for irradiating light into the shaped body, wherein the shaped body comprises a plastic material for converting the irradiated light from the light source into secondary light and for transferring at least part of the secondary light within the plastic material in a first direction that is substantially parallel to the main surface of the shaped body, wherein at least part of the transferred secondary light is emitted at the graphical element or a portion of the graphical element in a second direction that is oblique or substantially orthogonal to the first direction.
2. The chip card according to claim 1, wherein the light source is at least partially disposed within the shaped body.

3. The chip card according to claim 1, wherein the incident light from the light source travels, in the shaped body, substantially parallel to the main surface of the shaped body.

4. The chip card according to claim 1, wherein the light source is covered by at least an opaque layer towards the outer side of the card body.

5. The chip card according to claim 1, wherein the card body has an electrical energy storage device for supplying the light source with electrical power.

6. The chip card according to claim 5, wherein the card body has a switching element for switching the light source on and off.

7. The chip card according to claim 1, wherein the card body has a receiving device for a contactless energy transmission.

8. The chip card according to claim 7, wherein the light source is connected to the receiving device.

9. The chip card according to claim 1, wherein the light source is formed as a light-emitting diode.

10. The chip card according to claim 1, wherein the shaped body is at least partially disposed in at least one cavity of the card body, the cavity defining an outline of the graphical element.

11. The chip card according to claim 10, wherein the shaped body is made to be clear or translucent within the cavity.

12. The chip card according to claim 10, wherein the shaped body has a larger lateral extent than the cavity.

13. The chip card according to claim 10, wherein the card body is made to be opaque in the lateral surrounding area of the cavity.

14. The chip card according to claim 13, wherein the card material adjoining the cavity laterally is opaque.

15. The chip card according to claim 13, wherein the card body is provided with opaque printing at least in a lateral surrounding area of the cavity.

16. The chip card according to claim 1, wherein the shaped body has a laterally extended area that corresponds to an area of the graphical element, and wherein the shaped body has optical properties that are different within the area than outside of the area.

17. The chip card according to claim 16, wherein the shaped body is made to be translucent only within the area that is different with regard to the optical properties so that the area of the graphical element appears brighter than an adjacent area.

18. The chip card according to claim 16, wherein the shaped body has a three-dimensional surface structure only within the area that is different with regard to the optical properties so that the area of the graphical element appears brighter than an adjacent area.

19. The chip card according to claim 18, wherein the three-dimensional surface structure is formed by one of (1) a plurality of elevations distributed over the entire surface of the area that is different with regard to the optical properties, (2) a plurality of depressions distributed over the entire surface of the area that is different with regard to the optical properties, and (3) a plurality of elevations and depressions distributed over the entire surface of the area that is different with regard to the optical properties.

20. The chip card according to claim 1, wherein the shaped body is made to be clear in at least some areas.

21. The chip card according to claim 1, wherein the card body has a transparent cover layer on at least one main surface.

22. The chip card according to claim 1, wherein the card body has been produced by lamination.

23. The chip card according to claim 1, wherein the shaped body is formed as a stamped part.

24. The chip card according to claim 1, wherein the card body has an integrated circuit.

25. The chip card according to claim 24, wherein the card body further has a magnetic strip.

26. The chip card according to claim 1, wherein the plastic material of the shaped body comprises a fluorescent coloring agent, and wherein the secondary light has a larger wavelength than the irradiated light from the light source.

27. The chip card according to claim 26, wherein the irradiated light from the light source is substantially completely converted into the secondary light while traveling through the shaped body.

* * * * *